(12) United States Patent
Arakane et al.

(10) Patent No.: US 10,987,938 B2
(45) Date of Patent: Apr. 27, 2021

(54) IMAGE PROCESSING DEVICE GENERATING PRINT DATA FOR PRINTER PROVIDED WITH PRINT HEAD HAVING A PLURALITY OF NOZZLES

(71) Applicant: Brother Kogyo Kabushiki Kaisha, Nagoya (JP)

(72) Inventors: Satoru Arakane, Nagoya (JP); Masashi Kuno, Obu (JP); Shota Morikawa, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 16/525,011

(22) Filed: Jul. 29, 2019

(65) Prior Publication Data

US 2020/0039233 A1 Feb. 6, 2020

(30) Foreign Application Priority Data

Aug. 6, 2018 (JP) .............................. JP2018-147986

(51) Int. Cl.
*B41J 2/21* (2006.01)
(52) U.S. Cl.
CPC .................................. *B41J 2/2103* (2013.01)
(58) Field of Classification Search
CPC .... B41J 2/2103; B41J 2/2132; B41J 2/04508; B41J 2/04586
See application file for complete search history.

(56) References Cited

U.S. PATENT DOCUMENTS

2016/0089887 A1* 3/2016 Shindo ................. B41J 2/16508
347/35
2019/0009523 A1* 1/2019 Morikawa .............. B41J 2/2132

FOREIGN PATENT DOCUMENTS

JP 2007-245651 A 9/2007
JP 2014-151514 A 8/2014

* cited by examiner

*Primary Examiner* — Jason S Uhlenhake
(74) *Attorney, Agent, or Firm* — Banner & Witcoff, Ltd.

(57) ABSTRACT

An image processing device is communicable with a printer and includes a controller. The printer is configured to repeatedly and alternately execute a partial print and a sub scan to form an image. The image is made up of a plurality of partial images arranged in a sub scanning direction. The partial print forms a target partial image while performing a main scan. The controller is configured to perform: setting; generating; and outputting. The setting sets a printing direction for the partial print to one of first and second directions. The generating generates partial print data for the partial print by executing a color conversion process on target partial image data using a color conversion profile. The color conversion profile is selected from first and second profiles respectively corresponding to the first and second directions. The outputting outputs the partial print data and direction information specifying the printing direction.

14 Claims, 9 Drawing Sheets

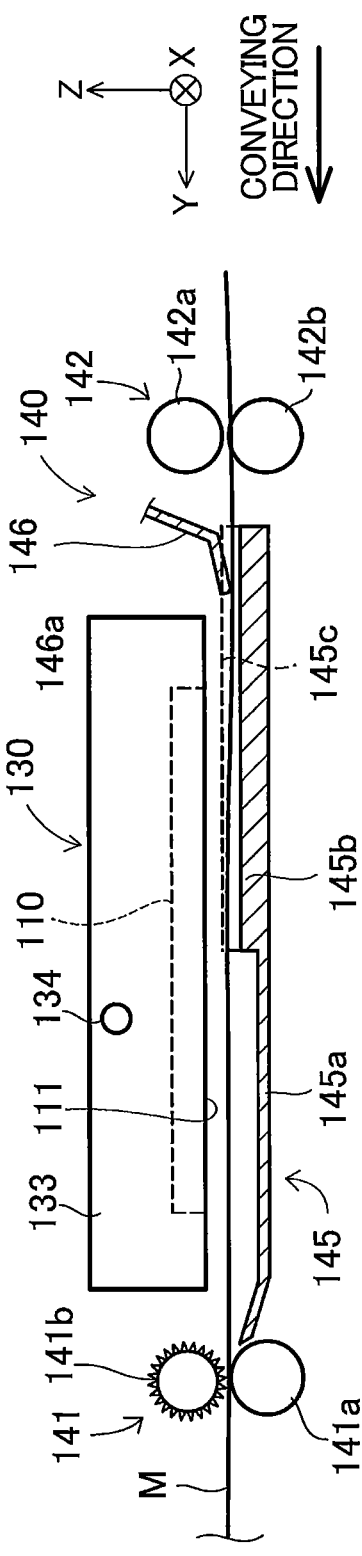
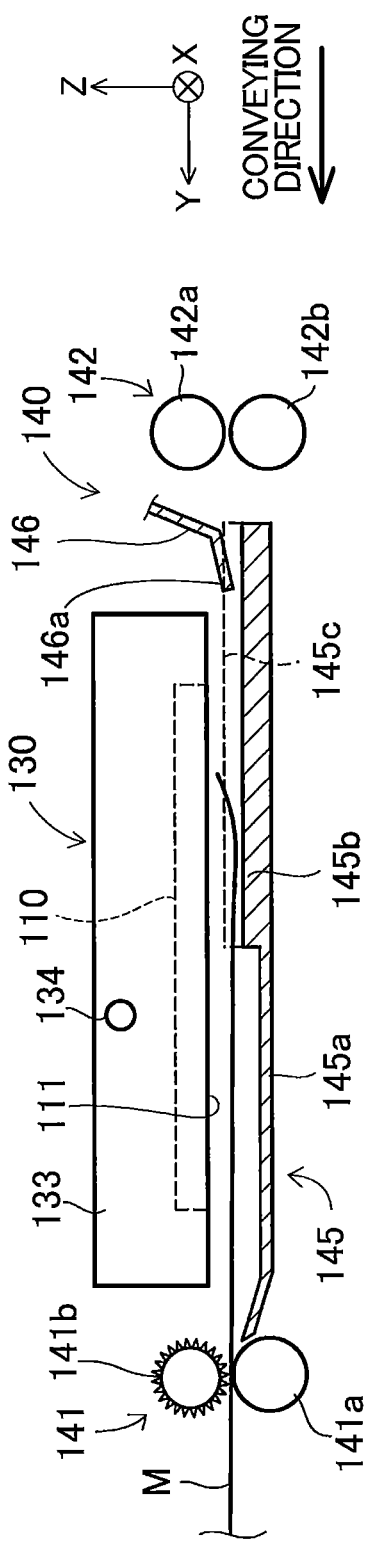

FIG. 4A
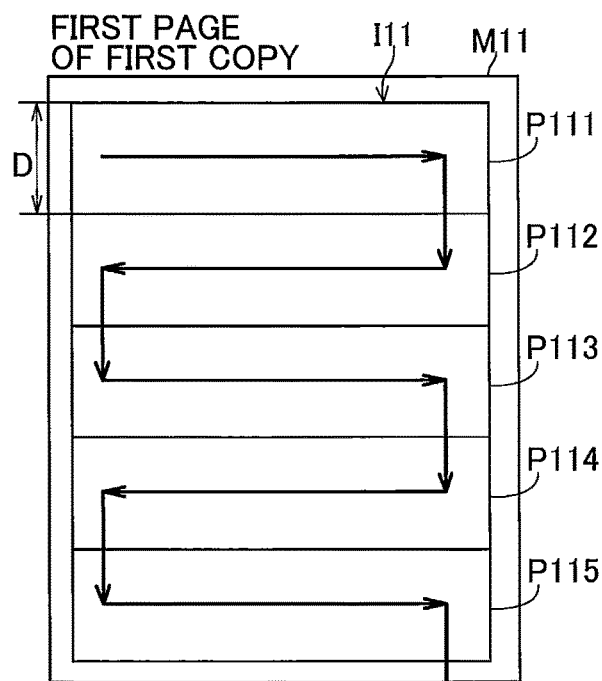
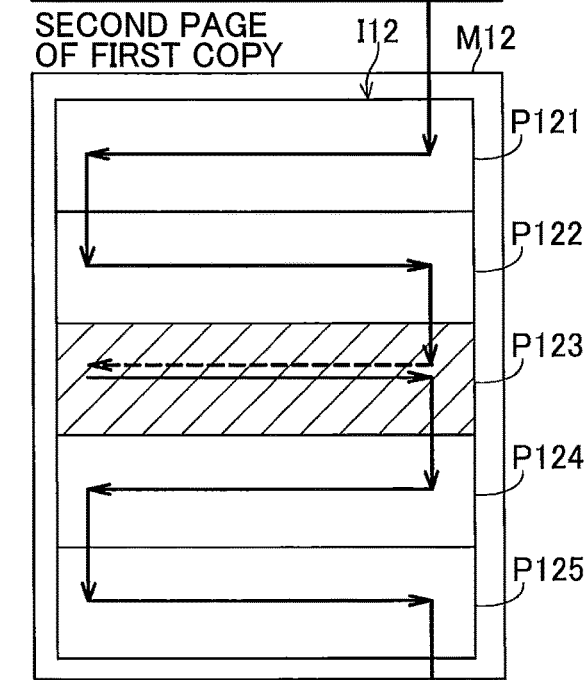
FIG. 4B
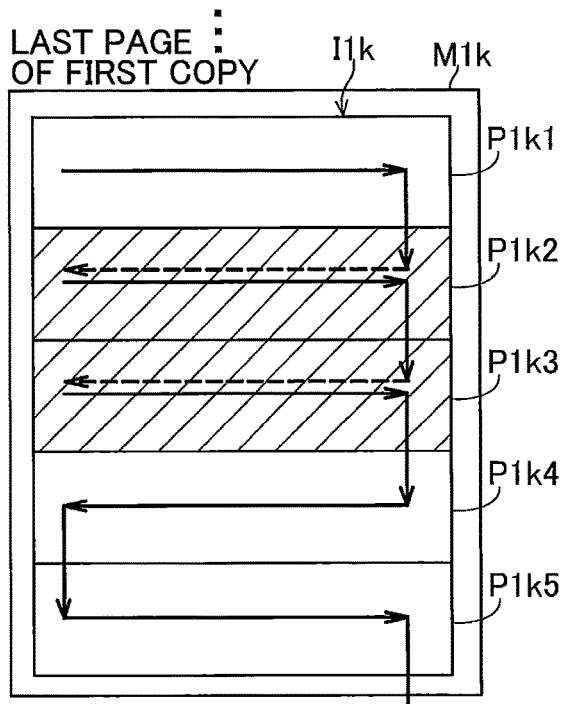
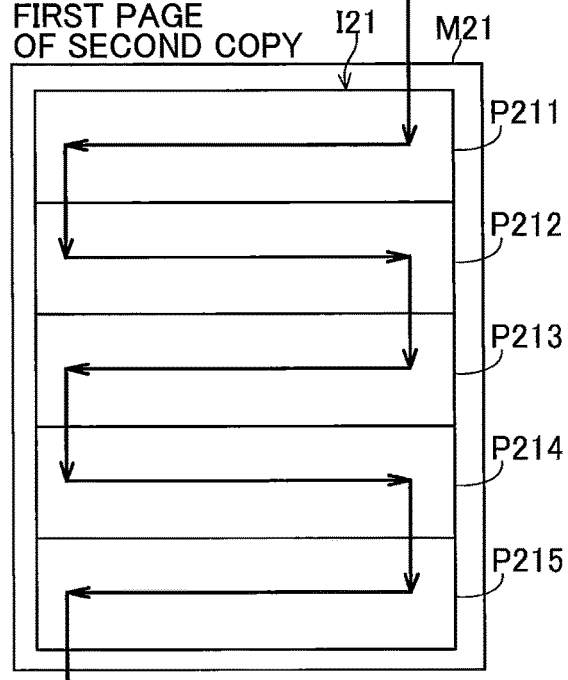

IMAGE PROCESSING DEVICE GENERATING PRINT DATA FOR PRINTER PROVIDED WITH PRINT HEAD HAVING A PLURALITY OF NOZZLES

CROSS REFERENCE TO RELATED APPLICATION

This application claims priority from Japanese Patent Application No. 2018-147986 filed Aug. 6, 2018. The entire content of the priority application is incorporated herein by reference.

TECHNICAL FIELD

The present disclosure relates to an image process for a printer that performs printing by alternately and repeatedly executing a partial print to form dots while performing a main scan, and a sub scan.

BACKGROUND

In a conventional printing process, an outgoing print for printing while the print head is moving in a prescribed direction is alternately performed with a return print for printing while the print head is moving in the direction opposite the prescribed direction. In this printing process, two lookup tables are used for the outgoing print and the return print in the color conversion process for converting RGB data to CMYK data in order to eliminate color irregularity caused by differences in the ejection sequence of ink.

SUMMARY

In the conventional printing process described above, the outgoing print and return print are executed alternately and repeatedly. However, it is not always preferable simply to alternate the outgoing and return prints repeatedly in a printing process.

In view of the foregoing, it is an object of the present disclosure to provide a technique to improve a printing process using outgoing prints and return prints.

In order to attain the above and other objects, the present disclosure provides an image processing device communicable with a printer. The printer includes: a print head; a first scanner; and a second scanner. The print head has a plurality of nozzles. The plurality of nozzles includes a first nozzle and a second nozzle. The second nozzle is disposed apart from the first nozzle in a main scanning direction. The first nozzle is configured to eject a droplet of a first type of ink. The second nozzle is configured to eject a droplet of a second type of ink. The first scanner is configured to perform a main scan. The main scan moves the print head relative to a printing medium in the main scanning direction. The second scanner is configured to perform a sub scan. The sub scan intermittently moves the printing medium relative to the print head in a sub scanning direction orthogonal to the main scanning direction. The printer is configured to repeatedly and alternately execute a partial print and the sub scan to form an image represented by image data on the printing medium. The image is made up of a plurality of partial images arranged in the sub scanning direction. The partial print forms a target partial image on the printing medium while performing the main scan. The plurality of partial images is represented by respective ones of the plurality of sets of partial image data. The image processing device includes a controller. The controller is configured to perform: (a) selecting; (b) setting; (c) generating; and (d) outputting. The (a) selecting selects a single partial image one by one from the plurality of partial images as the target partial image. The target partial image is represented by target partial image data. The target partial image data corresponds to one of the plurality of sets of partial image data. The (b) setting sets a printing direction for the partial print to one of a first direction and a second direction. The first direction and the second direction are parallel to the main scanning direction and are opposite to each other. The partial print is to be executed to form the target partial image while performing the main scan in which the print head is moved in the printing direction. The (c) generating generates partial print data for the partial print by executing an image process on the target partial image data. The partial print data is to be used for forming the target partial image by the printer. The image process includes a color conversion process using a color conversion profile. The color conversion profile is selected from a first profile and a second profile. The first profile is selected for the partial print for which the first direction is set as the printing direction. The second profile is selected for the partial print for which the second direction is set as the printing direction. The (d) outputting outputs the partial print data generated for the partial print and direction information specifying the printing direction set for the partial print.

According to another aspect, the present disclosure also provides a non-transitory computer readable storage medium storing a set of program instructions for an image processing device communicable with a printer. The printer includes: a print head; a first scanner; and a second scanner. The print head has a plurality of nozzles. The plurality of nozzles includes a first nozzle and a second nozzle. The second nozzle is disposed apart from the first nozzle in a main scanning direction. The first nozzle is configured to eject a droplet of a first type of ink. The second nozzle is configured to eject a droplet of a second type of ink. The first scanner is configured to perform a main scan. The main scan moves the print head relative to a printing medium in the main scanning direction. The second scanner is configured to perform a sub scan. The sub scan intermittently moves the printing medium relative to the print head in a sub scanning direction orthogonal to the main scanning direction. The printer is configured to repeatedly and alternately execute a partial print and the sub scan to form an image represented by image data on the printing medium. The image is made up of a plurality of partial images arranged in the sub scanning direction. The partial print forms a target partial image on the printing medium while performing the main scan. The plurality of partial images is represented by respective ones of the plurality of sets of partial image data. The image processing device includes a controller. The set of program instructions, when executed by the controller, causes the image processing device to perform: (a) selecting; (b) setting; (c) generating; and (d) outputting. The (a) selecting selects a single partial image one by one from the plurality of partial images as the target partial image. The target partial image is represented by target partial image data. The target partial image data corresponds to one of the plurality of sets of partial image data. The (b) setting sets a printing direction for the partial print to one of a first direction and a second direction. The first direction and the second direction are parallel to the main scanning direction and are opposite to each other. The partial print is to be executed to form the target partial image while performing the main scan in which the print head is moved in the printing direction. The (c) generating generates partial print data for the partial print by executing an image process on the target partial image data. The partial print data is to be used for forming the target partial image by the printer. The image process includes a color conversion process using a color conversion profile. The color conversion profile is selected form a first profile and a second profile. The first profile is selected for the partial print for which the first direction is set as the printing direction. The second profile is selected for the partial print for which the second direction is set as the printing direction. The (d) outputting outputs the partial print data generated for the partial print and direction information specifying the printing direction set for the partial print.

BRIEF DESCRIPTION OF THE DRAWINGS

The particular features and advantages of the disclosure as well as other objects will become apparent from the following description taken in connection with the accompanying drawings, in which:

FIG. 2A illustrates the overall configuration of a printing mechanism in the printer when a sheet M is in a double-sided held state;

FIG. 2B illustrates the overall configuration of the printing mechanism in the printer when the sheet M is in a single-sided held state;

FIGS. 4A and 4B are explanatory diagrams illustrating operations of the printing mechanism according to the first embodiment, in which FIG. 4A illustrates operations when the first and second pages of the first copy are printed, and FIG. 4A illustrates operations when the last page of the first copy and the first page of the second copy are printed;

DETAILED DESCRIPTION

A. First Embodiment

A-1: Configuration of Printing System 1000

Figure 1:
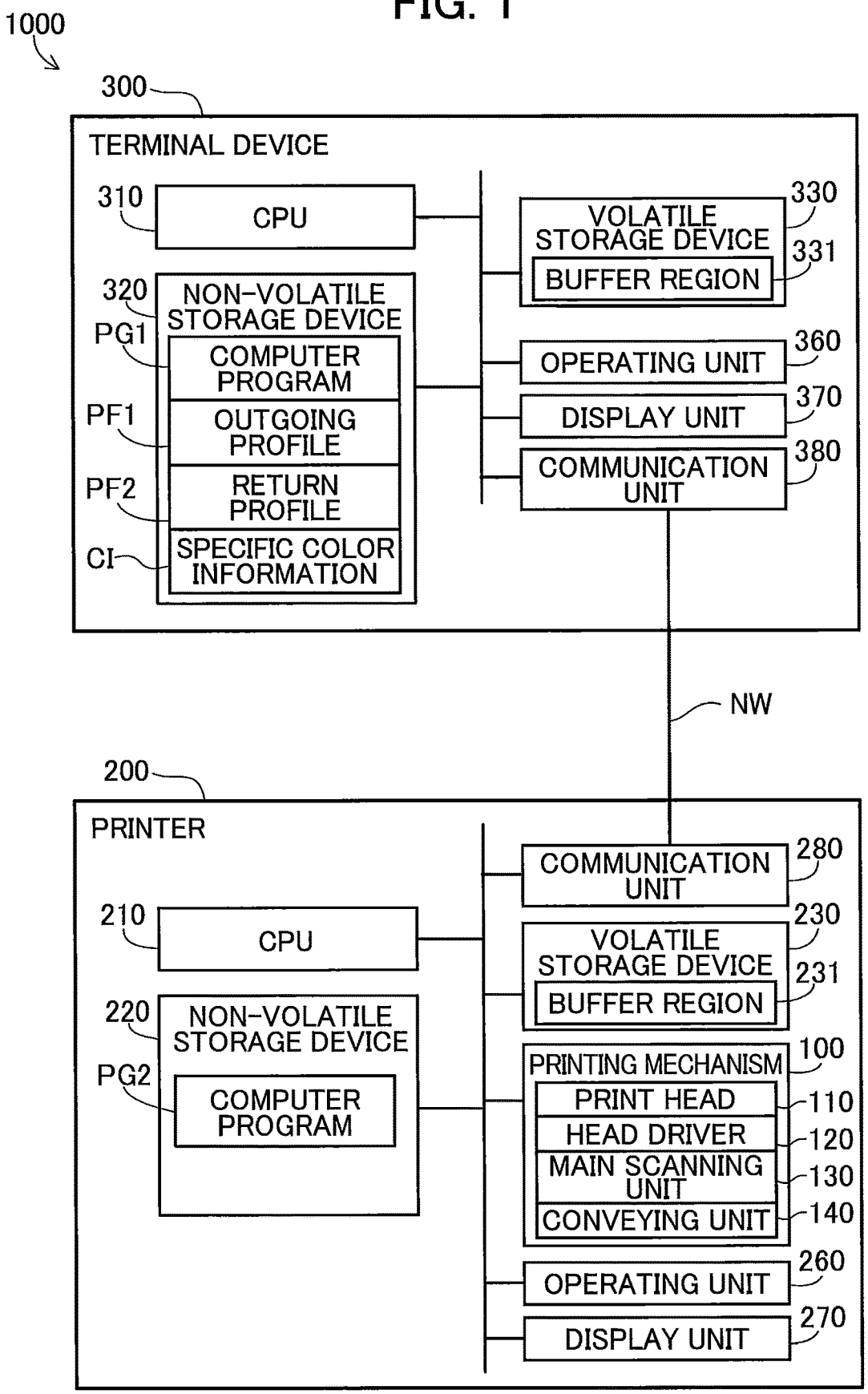
FIG. 1 is a block diagram illustrating the configuration of a printing system including a printer and a terminal device according to a first embodiment of the present disclosure.

Next, an embodiment will be described while referring to the accompanying drawings. FIG. 1 is a block diagram illustrating the configuration of a printing system 1000 according to the first embodiment.

The printing system 1000 includes a printer 200 and a terminal device 300 serving as an image processing device according to the present embodiment. The printer 200 and the terminal device 300 are connected to and capable of communicating with each other via a wired or wireless network NW.

The terminal device 300 is a computer used by a user of the printer 200 and, for example, is a personal computer or a smartphone. The terminal device 300 includes a central processing unit (CPU) 310 serving as a controller of the terminal device 300; a non-volatile storage device 320, such as a hard disk drive; a volatile storage device 330, such as a random access memory (RAM); an operating unit 360, such as a mouse and a keyboard; a display unit 370, such as a liquid crystal display; and a communication unit 380. The communication unit 380 includes a wired or wireless interface for connecting to the network NW.

The volatile storage device 330 provides a buffer region 331 for the CPU 310. The non-volatile storage device 320 stores a computer program PG1, an outgoing profile PF1, a return profile PF2, and specific color information CI. The computer program PG1, the outgoing profile PF1, the return profile PF2, and the specific color information CI are provided by the manufacturer of the printer 200, for example, in the form of data downloaded from a server or data stored in a digital versatile disc-read only memory (DVD-ROM). The CPU 310 functions as a printer driver controlling the printer 200 by executing the computer program PG1. The CPU 310 serving as the printer driver causes the printer 200 to print an image, for example, by performing an image process as described later.

The outgoing profile PF1 and return profile PF2 each defines a correlation between color values in the RGB color system (RGB values) and color values in the CMYK color system (CMYK values). Each RGB value is a color value including three component values of red (R), green (G), and blue (B) colors. Each CMYK value is a color value including multiple component values of corresponding to colorants, such as inks, used for printing. In this embodiment, each CMYK value includes component values of cyan (C), magenta (M), yellow (Y), and black (K) colors. The RGB values and the CMYK values are, for example, 256 gradation values. The outgoing profile PF1 and return profile PF2 are, for example, lookup tables. The difference between the outgoing profile PF1 and the return profile PF2, and the specific color information CI will be described later.

The printer 200 includes, for example, a printing mechanism 100; a CPU 210 serving as a controller of the printer 200; a non-volatile storage device 220, such as a hard disk drive; a volatile storage device 230, such as a RAM; an operating unit 260, such as buttons and a touch panel for receiving a user operation; a display unit 270, such as a liquid crystal display; and a communication unit 280. The communication unit 280 includes a wired or wireless interface for connecting to the network NW. The printer 200 is connected to and capable of communicating with an external device, e.g., the terminal device 300 via the communication unit 280.

The volatile storage device 230 provides a buffer region 231 for temporarily storing various types of intermediate data generated during processing by the CPU 210. The non-volatile storage device 220 stores a computer program PG2. The computer program PG2 in the present embodiment is a control program for controlling the printer 200, and can be stored in the non-volatile storage device 220 before shipment of the printer 200. Alternatively, the computer program PG2 may be provided in the form of data downloaded from a server or data stored on a DVD-ROM. The CPU 210 executes the computer program PG2 to control the printing mechanism 100 in accordance with, for example, print data and direction information (described later) transmitted from the terminal device 300 during an image process described later, and print an image on a printing medium (for example, a sheet).

The printing mechanism 100 performs printing by ejecting ink droplets of cyan (C), magenta (M), yellow (Y), and black (K) colors. The printing mechanism 100 includes a print head 110, a head driver 120, a main scanning unit 130, and a conveying unit 140.

FIGS. 2A and 2B illustrate the overall configuration of the printing mechanism 100. With reference to FIG. 2A, the main scanning unit 130 includes a carriage 133 carrying the print head 110 and a sliding shaft 134 holding the carriage 133 such that the carriage 133 can reciprocate in a main scanning direction (the X direction indicated in FIG. 2A). The main scanning unit 130 uses the power from a main scanning motor (not illustrated) to reciprocate the carriage 133 along the sliding shaft 134. This achieves main scans in which the print head 110 is reciprocated relative to a sheet M in the main scanning direction.

The conveying unit 140 holds and conveys the sheet M in the conveying direction (the +Y direction indicated in FIG. 2A) orthogonal to the main scanning direction. The conveying unit 140 includes a platen 145, a pair of upstream rollers 142, a pair of downstream rollers 141, and a plurality of pressing members 146, as illustrated in FIG. 2A. Hereinafter, the upstream side (−Y side) in the conveying direction may also be referred to as "upstream side," and the downstream side (+Y side) in the conveying direction may also be referred to as "downstream side."

The upstream rollers 142 are disposed on the upstream side (−Y side) of the print head 110, while the downstream rollers 141 are disposed on the downstream side (+Y side) of the print head 110. The upstream rollers 142 include a drive roller 142a that is driven by a conveying motor (not illustrated), and a follow roller 142b that rotates along with the rotation of the drive roller 142a. Similarly, the downstream rollers 141 include a drive roller 141a and a follow roller 141b. Note that plate members may be employed in place of the follow rollers, whereby sheets M are held between the drive rollers and corresponding plate members.

The platen 145 is disposed at a position between the upstream rollers 142 and downstream rollers 141 and confronts a nozzle-forming surface 111 of the print head 110. The pressing members 146 are arranged between the upstream rollers 142 and the print head 110.

The platen 145 includes a flat plate 145a, a plurality of low support members 145b, and a plurality of high support members 145c.

The flat plate 145a is a plate member that is arranged substantially parallel to the main scanning direction (X direction) and the conveying direction (+Y direction). The low support members 145b are ribs that are elongated in the conveying direction and juxtaposed in the main scanning direction. The low support members 145b are erected from the upstream side of the flat plate 145a relative to the conveying direction. The pressing members 146 are provided to respectively correspond with the low support members 145b and are arranged at the same positions in the main scanning direction as the low support members 145b. The pressing members 146 and low support members 145b support sheets M as the sheets M are being conveyed. The high support members 145c are ribs elongated in the conveying direction. The edges of the high support members 145c facing in the Z-direction are positioned closer to the nozzle-forming surface 111 than the low support members 145b. The high support members 145c and low support members 145b are arranged alternately along the main scanning direction. With this arrangement, a sheet M being conveyed over the high support members 145c and low support members 145b is deformed and maintained in a rippled state along the main scanning direction (not illustrated). When deformed in this rippled shape, the sheet M has greater rigidity and is less susceptible to deformation along the conveying direction.

The head driver 120 (see FIG. 1) provides a drive signal to the print head 110 to drive the print head 110 while the main scanning unit 130 performs a main scan of the print head 110. The print head 110 ejects ink in accordance with the drive signal onto the sheet M conveyed by the conveying unit 140, to form dots on the sheet M.

FIGS. 2A and 2B illustrate a sheet M held in two different states. Specifically, FIG. 2A illustrates the sheet M held on both ends by the downstream rollers 141 and upstream rollers 142, while FIG. 2B illustrates the sheet M held only by the downstream rollers 141. The relationship of these two held states relates to the second embodiment and will be described later with reference to the second embodiment.

Figure 3:
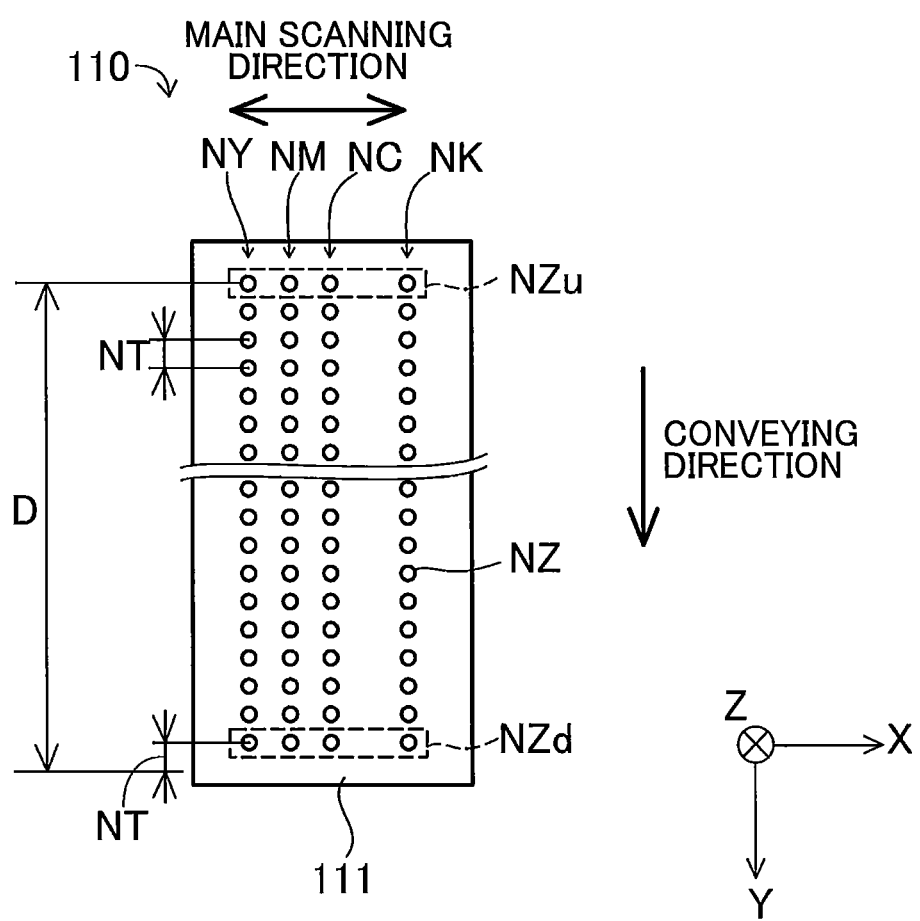
FIG. 3 illustrates the configuration of a print head in the printing mechanism of the printer viewed from the −Z side (from below in FIGS. 2A and 2B)

FIG. 3 illustrates the configuration of the print head 110 viewed from the −Z side (from below in FIGS. 2A and 2B). With reference to FIG. 3, the nozzle-forming surface 111 of the print head 110 has a plurality of nozzle rows. Each nozzle row includes an array of nozzles NZ. Specifically, the nozzle-forming surface 111 has nozzle rows NC, NM, NY, and NK respectively ejecting inks of the CMYK colors. Each nozzle row includes a plurality of nozzles NZ. The nozzles NZ are arranged at different positions along the conveying direction (+Y direction), specifically at a predetermined pitch NT. The pitch NT corresponds to the distance between any two nozzles NZ adjacent to each other in the conveying direction. Among the nozzles NZ in the nozzle rows NC, NM, NY, and NK, the nozzles NZ disposed on the most upstream side (−Y side) are referred to as "most upstream nozzles NZu." Among the nozzles NZ in the nozzle rows NC, NM, NY, and NK, the nozzles NZ disposed at the most downstream side (+Y side) are referred to as "most downstream nozzles NZd." The sum of the distance between a most upstream nozzle NZu and a corresponding most downstream nozzle NZd and the pitch NT is referred to as "nozzle array length D."

The nozzle rows NC, NM, NY, and NK are disposed apart from each other in the main scanning direction and are disposed at the same position in the sub scanning direction. For example, in the example illustrated in FIG. 3, the nozzle row NM is disposed on the downstream side of the nozzle row NY in the +X direction. Here, the nozzle NY consists of nozzles NZ ejecting Y color ink.

A-2. Overview of Printing

The printing mechanism 100 alternately performs a partial print and a sub scan several times to print an image on a sheet M. In the partial print, the print head 110 forms ink dots on the sheet M while the main scanning unit 130 performs a main scan. In a sub scan, the sheet M is conveyed in the sub scanning direction (conveying direction) by the conveying unit 140.

FIGS. 4A and 4B are explanatory diagrams for illustrating the operations of the printing mechanism 100 according to the first embodiment. FIG. 4A illustrates two sheets M11 and M12 and two pages (images) I11 and I12 to be printed on the corresponding sheets M11 and M12, and FIG. 4B illustrates two sheets M1k and M21 and two pages (images) I1k and I21 to be printed on the corresponding sheets M1k and M21. Each page includes a plurality of partial images. For example, page I11 to be printed on sheet M11 in FIG. 4A includes the partial images P111 to P115. Each partial image PI is an image printed by a single partial print.

In a partial print, the nozzles NZ ejects inks while the print head 110 is moved in either the forward (+X direction indicated in FIGS. 4A and 4B) or the backward (−X direction indicated in FIGS. 4A and 4B) with respect to the main scanning direction. Hereinafter, the direction in which the print head 110 is moved during a partial print referred to as the printing direction for the partial print. In addition, the forward in the main scanning direction (+X direction) is referred to the outgoing direction, and the backward in the main scanning direction (−X direction) is referred to as the return direction. The printing direction for a partial print is either the outgoing direction or the return direction. Hence, a partial print is either an outgoing print for forming dots while performing a main scan in the outgoing direction (+X direction), or a return print for forming dots while performing a main scan in the return direction (−X direction). An arrow formed of a solid line and pointing in either the +X direction or the −X direction is provided in each partial image in FIGS. 4A and 4B. A partial image having a solid arrow pointing in the +X direction (for example, the partial images P111, P113, and P115) is an outgoing partial image printed by an outgoing print. A partial image having a solid arrow pointing in the −X direction (for example, the partial images P112 and P114) is a return partial image printed by a return print.

Also in FIGS. 4A and 4B, each arrow pointing in the −Y direction and leading from one partial image (the partial image P111, for example) to another partial image adjacent to the one partial image in the −Y direction (the partial image P112, for example) corresponds to conveyance of the sheet M (a sub scan). In other words, an arrow pointing in the −Y direction in FIGS. 4A and 4B indicates that the print head 110 is moved in the −Y direction relative to the sheet M illustrated in FIG. 4 by conveying the sheet M in the +Y direction. As illustrated in FIGS. 4A and 4B, printing in the present embodiment is a process known as one-pass printing, and the dimension of each partial image in the conveying direction and one feed amount for the sheet M are both the nozzle array length D.

As illustrated in the print head 110 of FIG. 3, the nozzle rows NC, NM, NY, and NK for the respective CMYK colors are arranged at different positions in the main scanning direction. Accordingly, when forming dots in each of the CMYK colors at the same position on the sheet M, the order in which the dots are formed differs between an outgoing print and a return print. According to the example layout in FIG. 3, dots are formed in the sequence K, C, M, and Y in an outgoing print and are formed in the reverse order Y, M, C, and K in a return print. Consequently, in regions having dots of more than one color overlapping one another, the order in which the dots overlap will differ between an outgoing partial image and a return partial image. For this reason, the printed color tone may appear different between an outgoing partial image and a return partial image, even when both partial images are printed using the same dot data. This phenomenon in which the printed color tone differs between outgoing partial images and return partial images will be called the "outgoing/return color difference" in the following description.

Here, the outgoing profile PF1 described above is used for converting RGB values to CMYK values when generating partial print data for an outgoing print, i.e., print data for a single outgoing print to print an outgoing partial image. The return profile PF2 is used for converting RGB values to CMYK values when generating partial print data for a return print, i.e., print data for a single return print to print a return partial image. Color matching is performed between the outgoing profile PF1 and return profile PF2 to suppress the outgoing/return color difference described above. Specifically, the profiles PF1 and PF2 are adjusted so that the colors in an outgoing partial image printed on the basis of CMYK values obtained using the outgoing profile PF1 to convert specific RGB values approach the colors in a return partial image printed on the basis of CMYK values obtained using the return profile PF2 to convert the specific RGB values. However, the outgoing/return color difference cannot always be suppressed sufficiently using the outgoing profile PF1 and return profile PF2 because the difference is too great for specific colors. The specific color information CI described above (see FIG. 1) is information specifying specific colors that have this type of large outgoing/return color difference. For example, the specific color information CI may indicate a range of specific colors within the RGB color space.

A-3. Image Process

Figure 5:
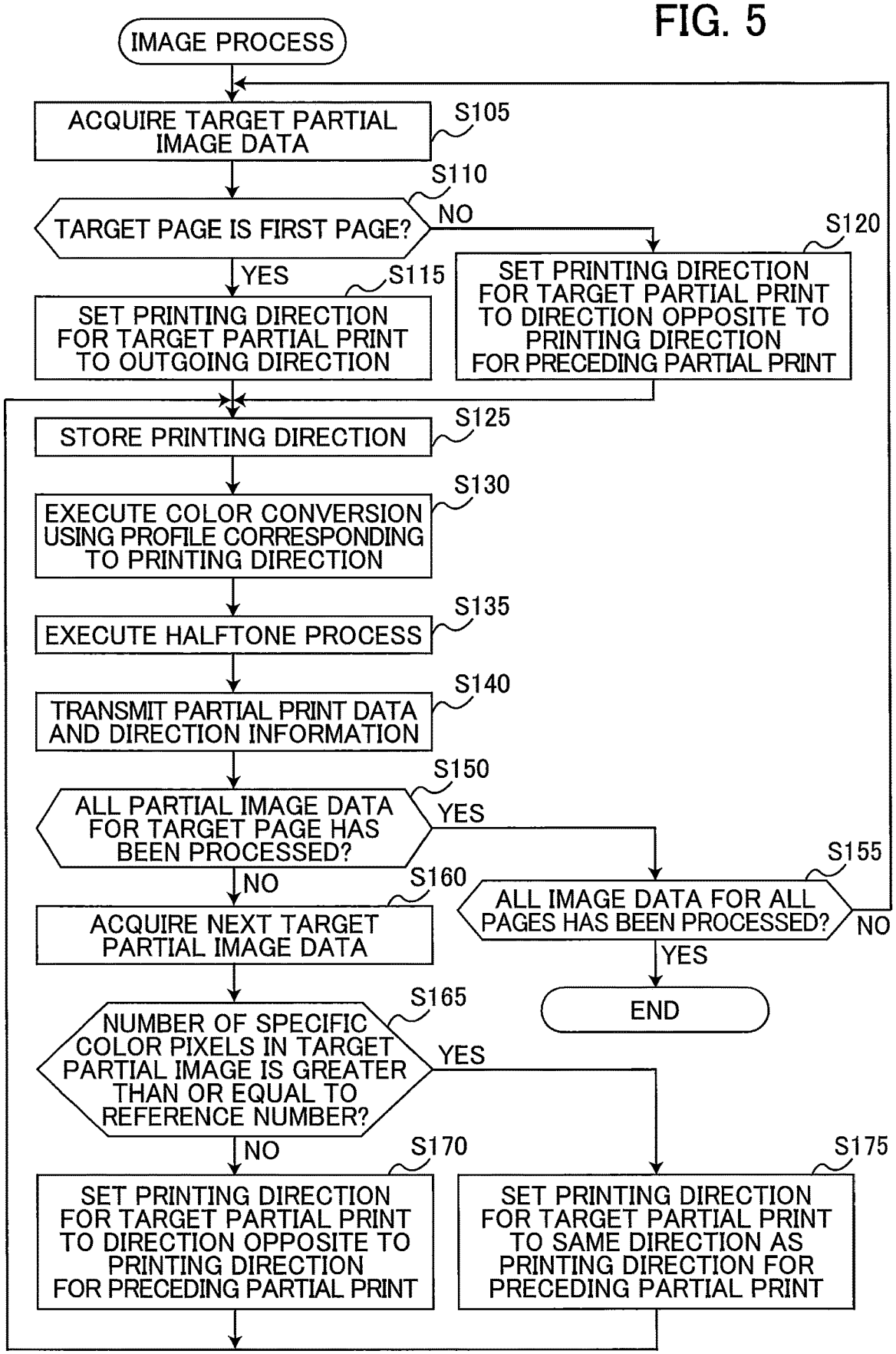
FIG. 5 is a flowchart illustrating steps in an image process executed by the terminal device according to the first embodiment.

FIG. 5 is a flowchart illustrating steps in an image process according to the first embodiment. The CPU 310 of the terminal device 300 (see FIG. 1) starts the image process in FIG. 5 upon receipt of a print command from the user. The print command includes a specification for image data representing an image to be printed. In this embodiment, the image data is an image file that includes k pages (where k is an integer greater than or equal to two). Further, the print command will be a command to print a plurality of copies, i.e., a command to print a set of pages specified by the image file m times (where m is an integer greater than or equal to two).

In S105 of FIG. 5, the CPU 310 acquires partial image data for one partial print from the image data specified by the print command. The CPU 310 acquires this partial image data, for example, from the non-volatile storage device 320 and stores the partial image data in the buffer region 331. The partial image data acquired from the non-volatile storage device 320 will be called target partial image data. The target partial image data acquired in S105 specifies the first partial image to be printed among all partial images included in the current page. Here, the partial image specified by the target partial image data will be called the target partial image. Similarly, the partial print performed to print the target partial image will be called the target partial print.

The partial image data is RGB image data representing the color of each pixel in RGB values, for example. If the partial image data is not RGB image data, the CPU 310 executes a rasterization process to convert the partial image data to RGB image data.

In S110 the CPU 310 determines whether the target page is the first page represented by the image data. The target page is the page that includes the target partial image. The first page denotes the initial page of the first copy. When the target page is the first page (S110: YES), in S115 the CPU 310 sets the printing direction for the target partial print to the outgoing direction. If the target page is not the first page (S110: NO), i.e., when the target page is the second or subsequent pages of the first copy or a page in the second copy or later, in S120 the CPU 310 sets the printing direction for the target partial print to the direction opposite the printing direction assigned to the preceding partial print. In other words, the CPU 310 sets the printing direction to the direction opposite the printing direction used for the last partial print when printing the page preceding the target page.

In S125 the CPU 310 stores the printing direction for the target partial print set in S115, S120, or in S170 or S175 described later, in the buffer region 331.

In S130 the CPU 310 executes a color conversion process on the target partial image data using the outgoing profile PF1 or return profile PF2 that corresponds to the printing direction set for the target partial print. Through this process, the CPU 310 converts the target partial image data from RGB image data to CMYK image data. CMYK image data represents the color of each pixel in CMYK values, as described above.

In S135 the 310 executes a halftone process on the converted target partial image data to generate partial print data for the target partial print. The partial print data generated in S135 specifies the dot formation state for each pixel and for each color component and will be called dot data. The dot formation state may indicate one of the values "dot," and "no dot," for example. Alternatively, the dot formation state may be one of the values "large dot," "medium dot," "small dot," and "no dot."

In S140 the CPU 310 transmits the partial print data generated in S135 and direction information specifying the printing direction for the target partial print to the printer 200. When the printer 200 receives this partial print data and direction information, the CPU 210 of the printer 200 executes a partial print based on the received information. For example, the CPU 210 executes an outgoing print to print the target partial image when the direction information specifies the outgoing direction, and executes a return print to print the target partial image when the direction information specifies the return direction.

In S150 the CPU 310 determines whether all partial image data for the target page has been processed. If all partial image data for the target page has been processed (S150: YES), in S155 the CPU 310 determines whether all image data for all pages to be printed has been processed. If the image data for all pages to be printed has been processed (S155: YES), the CPU 310 ends the image process. However, if there remain unprocessed pages (S155: NO), the CPU 310 returns to S105. For example, when three copies are to be printed, the CPU 310 determines that image data for all pages to be printed have been processed when image data for the last page of the third copy has been processed. When image data has been processed for the last page of the first copy, the CPU 310 determines that image data has not been processed for all pages. In this case, the CPU 310 returns to S105 to process image data for the initial page of the second copy.

Further, if the CPU 310 determines in S150 that there remains unprocessed partial image data (S150: NO), in S160 the CPU 310 acquires partial image data representing the next partial image to be printed and stores the partial image data in the buffer region 331 as the target partial image data.

In S165 the CPU 310 determines whether the target partial image represented by the target partial image data acquired in S160 includes a number of specific color pixels greater than or equal to a reference number. Specific color pixels are pixels having one of the specific colors described above, i.e., a color with a large outgoing/return color difference. In the present embodiment, the CPU 310 determines that pixels having RGB values within the range specified by the specific color information CI described above (see FIG. 1) are specific color pixels. The reference number is set to a number of pixels equivalent to a prescribed percentage of the total pixel number in the target partial image (20%, for example).

If the number of specific color pixels in the target partial image is not greater than or equal to the reference number (S165: NO), in S170 the CPU 310 sets the printing direction for the target partial print to the direction opposite the printing direction for the preceding partial print. If the number of specific color pixels in the target partial image is greater than or equal to the reference number (S165: YES), in S175 the CPU 310 sets the printing direction for the target partial print to the same direction used for the preceding partial print.

After setting the printing direction for the target partial print in S170 or S175, the CPU 310 returns to S125.

Here, a page (image) to be printed according to the image process described above will be described. As illustrated in FIG. 4, outgoing prints and return prints are alternated as a general rule when executing printing in the present embodiment (S170 and S120 of FIG. 5). This method can reduce the time required for printing.

In the embodiment described above, the CPU 310 sets the printing direction for each of a plurality of partial prints to one of the outgoing direction and return direction parallel to the main scanning direction (S115, S120, S170, and S175 in FIG. 5). The CPU 310 executes a print data generation process including a color conversion process on the partial image data to generate partial print data corresponding to a partial image for each partial print (S130 and S135 in FIG. 5). In the color conversion process of S130, the CPU 310 uses the outgoing profile PF1 when the printing direction for the target partial print is set to the outgoing direction and uses the return profile PF2 when the printing direction is set to the return direction. For each partial print, the CPU 310 transmits partial print data and direction information specifying the printing direction for the partial print corresponding to the partial print data to the printer 200 (S140 of FIG. 5). In this way, each of the partial images (the partial images P111 to P115, P121 to 125, P1k1 to P1k5, and P211 to P215 in the example of FIG. 4) is printed in the appropriate printing direction.

If direction information were not transmitted to the printer 200, the printer 200 could only perform partial prints in a predetermined printing direction. Printing in a predetermined printing direction might be printing that alternates between outgoing prints and return prints or printing using only outgoing prints or only return prints, for example. However, the printer 200 in the present embodiment can perform printing according to the printing direction specified in the direction information for each partial print, thereby performing printing using the most suitable printing direction. Thus, the printer 200 can execute partial prints in printing directions set by the terminal device 300, even when the terminal device 300 sets printing directions flexibly in accordance with the partial image data, for example.

According to the present embodiment, the CPU 310 sets the printing direction for a partial print on the basis of the partial image data representing the partial image to be printed in the partial print (S165 to S175 in FIG. 5). Accordingly, the CPU 310 can set suitable printing directions for the partial image data.

As an example, the CPU 310 uses the target partial image data to determine whether the number of specific color pixels included in the target partial image is greater than or equal to the reference number (S165). The CPU 310 sets the printing direction for the target partial print to the same direction used for the preceding partial print (S175) when the number of specific color pixels included in the target partial image is greater than or equal to the reference number (S165: YES) and sets the printing direction for the target partial print to the direction opposite the printing direction used in the preceding partial print (S170) when the number of specific color pixels included in the target partial image is less than the reference number (S165: NO). This technique can suppress a decline in image quality for the page (image) being printed. Specifically, this technique prevents the outgoing/return color difference described above from being too noticeable in the printed page (image).

In the example of FIGS. 4A and 4B, the shaded partial images are partial images that include a number of specific color pixels that is greater than or equal to the reference number. As illustrated in FIGS. 4A and 4B, the partial image P123 in the second page I12 of the first copy and the partial images P1$k$2 and P1$k$3 in the last page (k-th page) I1$k$ of the first copy have specific color pixels greater than or equal to the reference number. As illustrated in FIGS. 4A and 4B, these partial images P123, P1$k$2, and P1$k$3 are printed in the same printing direction used for the respective preceding partial images P122, P1$k$1, and P1$k$2. In these cases, a main scan without forming dots is performed between the preceding partial print and the current partial print for printing the current partial image, as indicated by arrows formed with dashed lines in FIGS. 4A and 4B. A main scan performed without forming dots (i.e., without printing a partial image) will be called a non-printing main scan. In the present embodiment, a non-printing main scan is performed between the preceding partial print and the partial print for printing a partial image that includes a number of specific color pixels that is greater than or equal to the reference number in order to move the print head 110 in the direction opposite the printing direction used in the preceding partial print.

While performing these non-printing main scans increases the required printing time relative to printing without performing non-printing main scans, this technique can prevent the outgoing/return color difference from becoming noticeable and, hence, can suppress a decline in quality in the printed images. In the example of FIG. 4B, the two partial images P1$k$2 and P1$k$3 are adjacent to each other and both include a number of specific color pixels greater than or equal to the reference number. Therefore, the outgoing/return color difference would be noticeable if both partial images were printed in different printing directions. Since the two partial images P1$k$2 and P1$k$3 illustrated in FIG. 4B are printed in the same printing direction in the present embodiment, an outgoing/return color difference is not produced between the partial images P1$k$2 and P1$k$3.

Further, when printing multiple copies in the present embodiment, the printing direction for the last partial print in the last page I1$k$ of the first copy (see FIG. 4B) and the printing direction for the first partial print in the first page I21 of the second copy are set to opposing directions (S120 of FIG. 5). That is, in the example of FIG. 4B, the printing direction for the last partial print in the last page I1$k$ of the first copy, i.e., the partial print for printing the partial image P1$k$5, is the outgoing direction (+X direction), and the printing direction for the first partial print in the first page I21 of the second copy, i.e., the partial print for printing the partial image P211, is the return direction (−X direction). More generally, to print m times (where m is an integer greater than or equal to two) a set of pages including a first page to be printed first and a second page to be printed last, the CPU 310 sets the printing direction for the first partial print used to print the first page of an (n+1)-th copy (where n is an integer greater than or equal to one and less than m) to the return direction when the printing direction for the last partial print used to print the second page of the n-th copy is set to the outgoing direction, and sets the printing direction for the first partial print used to print the first page in the (n+1)-th copy to the outgoing direction when the printing direction for the last partial print used to print the second page in the n-th copy is set to the return direction. This method avoids wasted movement of the print head 110 (i.e., a main scan performed without forming dots) between printing of the n-th page set and printing of the (n+1)-th page set. Since the images in the first copy are the same as the images in the second copy, the images in the second copy can be printed using the same image data used for printing the first copy. However, when the processing time required for the terminal device 300 (the CPU 310) to generate image data for printing is shorter than the operating time required for the printer 200 (the printing mechanism 100) to print the images on sheets M, it is more likely that the time required for the overall printing process can be reduced by regenerating image data with different printing directions for printing the second copy, even though the same image is being printed. Therefore, the present embodiment can reduce the printing time.

In the present embodiment, the terminal device 300 transmits partial print data and the corresponding direction information to the printer 200 over the network NW. Thus, the printer 200 can appropriately perform partial prints using printing directions set by the terminal device 300 connected to the printer 200 over the network NW.

B. Second Embodiment

Since the process performed in the second embodiment depends on the held state of the sheet M, the held states of the sheet M will be described next. When printing one page, the held state of the sheet M transitions from a double-sided held state illustrated in FIG. 2A to a single-sided held state illustrated in FIG. 2B while printing the region of the sheet M near the upstream end in the conveying direction (the −Y end).

The pair of downstream rollers 141 in FIG. 2A can be called the downstream-side holder that holds the sheet M at a position on the downstream side (+Y side) of the nozzles NZ in the print head 110. The pair of upstream rollers 142 in FIG. 2A and a set of the pressing members 146 and low support members 145$b$ in FIG. 2A can be called the upstream-side holder that holds the sheet M at a position on the upstream side (−Y side) of the nozzles NZ in the print head 110.

In the double-sided held state illustrated in FIG. 2A, the sheet M is held both by the downstream-side holder and upstream-side holder. In the single-sided held state illustrated in FIG. 2B, the sheet M is held by the downstream-side holder but not by the upstream-side holder.

Figure 6:
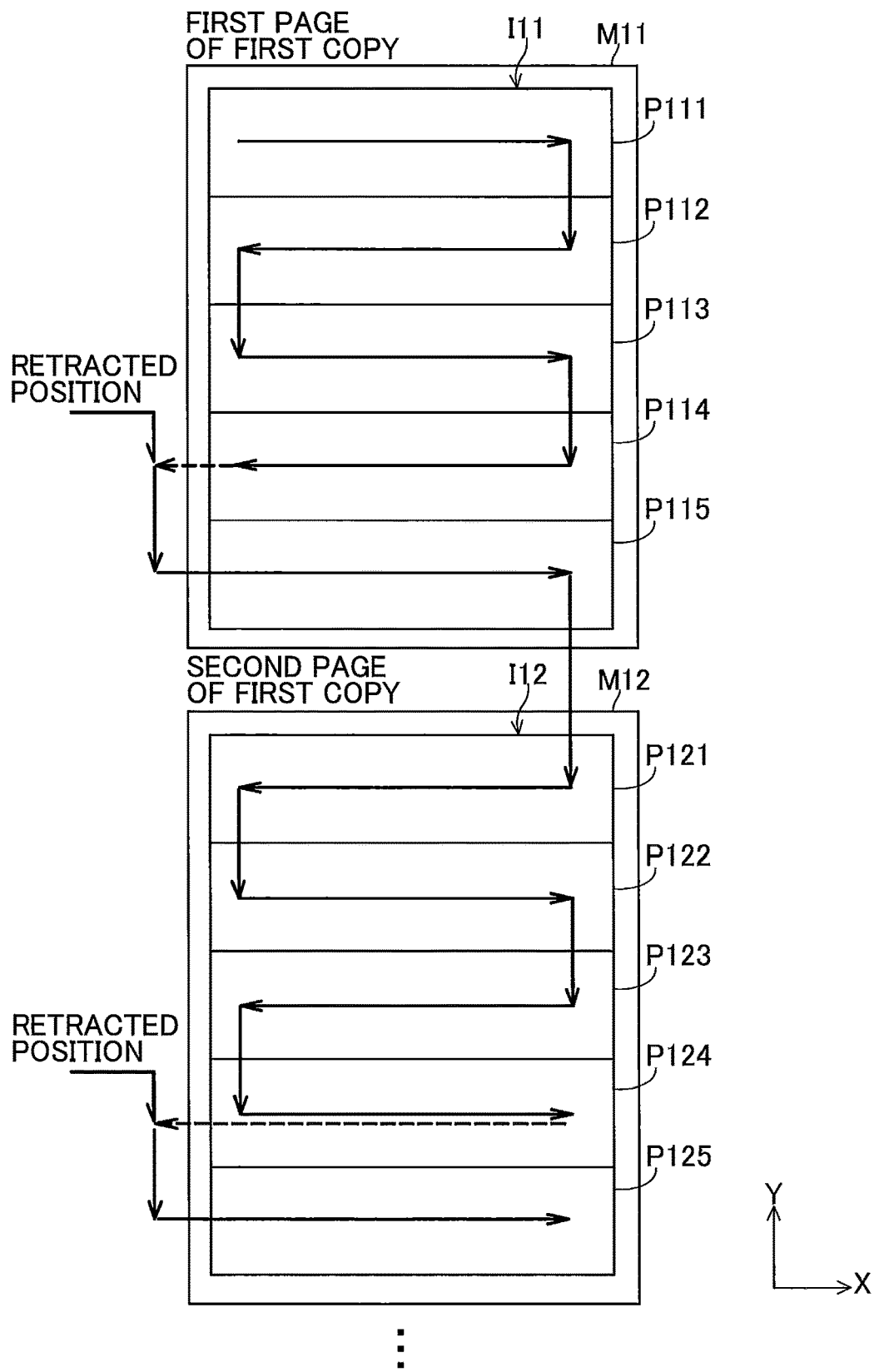
FIG. 6 is an explanatory diagram illustrating operations of the printing mechanism according to a second embodiment, in which retraction of the print head is performed when a held state of a sheet transitions from the double-sided held state illustrated in FIG. 2A to a single-sided held state illustrated in FIG. 2B.

FIG. 6 is a first explanatory diagram illustrating operations of the printing mechanism 100 according to the second embodiment. FIG. 6 illustrates pages (images) I11 and I12 to be printed on sheets M11 and M12, respectively. In FIG. 6, the page I11 includes five partial images P111 to P115, and the page I12 includes five partial images P121 to P125.

In the second embodiment, the held state of the sheet M transitions from the double-sided held state to the single-sided held state when the sheet M is fed between the fourth partial print and fifth partial print among the five partial prints used to print one page. In the example of FIG. 6, the held state of the sheet M transitions from the double-sided held state to the single-sided held state when the sheet M is conveyed between the partial print for printing the partial image P114 and the partial print for printing the partial image P115 and when the sheet M is conveyed between the partial print for printing the partial image P124 and the partial print for printing the partial image P125.

Since the upstream edge of the sheet M passes out from beneath the pressing members 146 at the moment the held state of the sheet M transitions from the double-sided held state to the single-sided held state, the portion of the sheet M near the upstream edge often changes shape, curling upward along the conveying direction as illustrated in FIG. 2B. When the print head 110 is positioned above (on the +Z side of) the sheet M at this time, the upstream edge of the sheet M may contact the nozzle-forming surface 111 of the print head 110 and ink may be unintentionally deposited on the sheet M. In order to avoid this problem, in the present embodiment, the printing mechanism 100 moves the print head 110 to a prescribed retracted position that is not above the sheet M while the conveyance of the sheet M changes the holding state of the sheet M from the double-sided held state to the single-sided held state.

The retracted position is indicated in FIG. 6. In the present embodiment, the retracted position is a prescribed position farther in the return direction (toward the −X side) than the sheet M. Alternatively, the retracted position may be a prescribed position farther in the outgoing direction (toward the +X side) than the sheet M. In the present embodiment, the printing mechanism 100 moves the print head 110 to the retracted position after completing the fourth partial print, as illustrated in FIG. 6. The printing mechanism 100 conveys the sheet M while the print head 110 is in the retracted position. After conveying the sheet M, the printing mechanism 100 executes the fifth partial print.

In the present embodiment, the CPU 210 of the printer 200 determines the timing at which the held state of the sheet M will transition from the double-sided held state to the single-sided held state on the basis of the number of printed raster lines and the resolution in the conveying direction, for example, and independently from instructions received from the terminal device 300. The CPU 210 of the printer 200 controls the printing mechanism 100 on the basis of these determination results to move the print head 110 to the retracted position.

Figure 7:
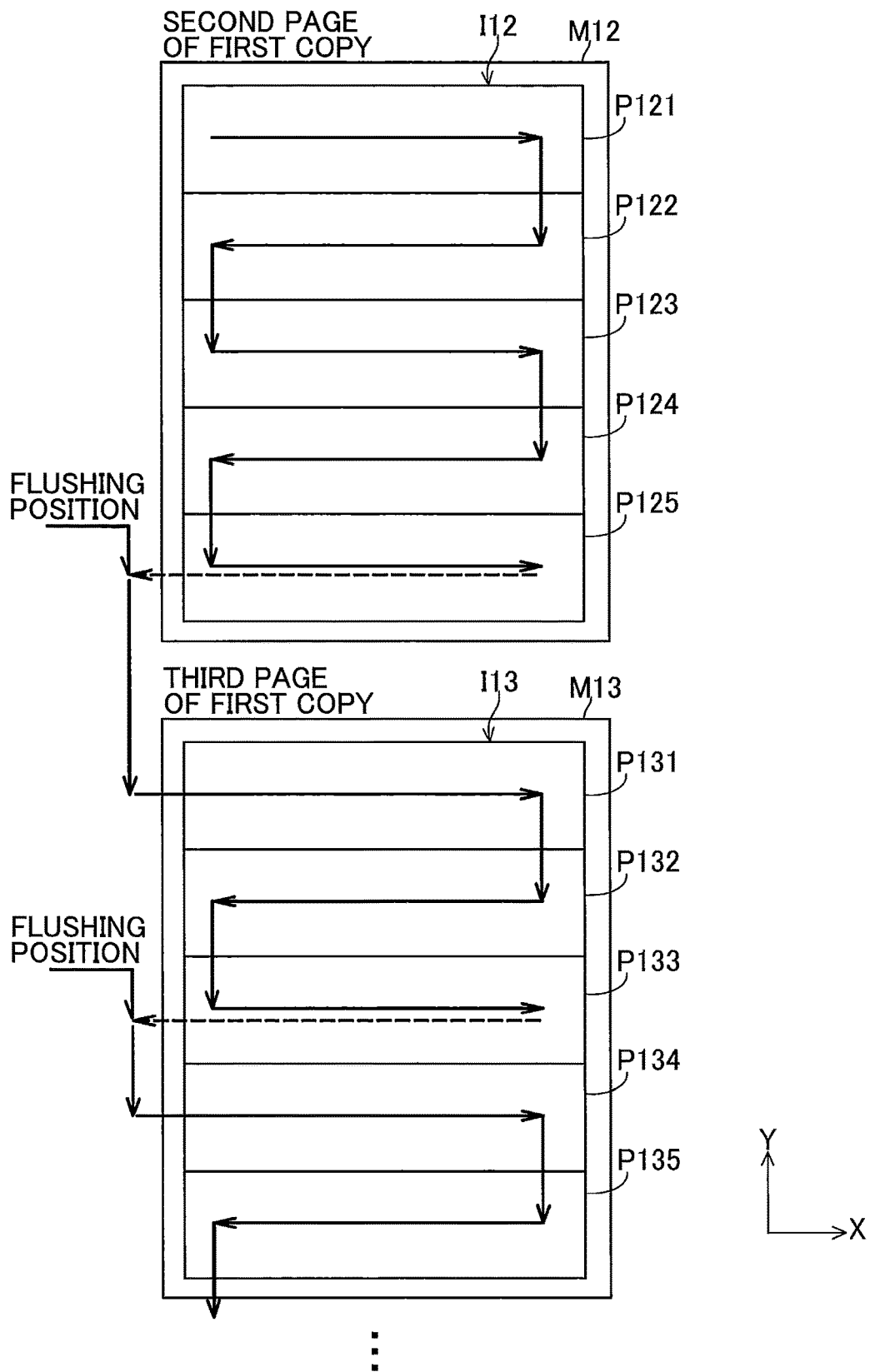
FIG. 7 is an explanatory diagram illustrating operations of the printing mechanism according to the second embodiment, in which retraction of the print head is performed for flushing of the print head.

The process performed in the second embodiment also depends on the need to perform flushing. Therefore, the process of flushing will be described next. FIG. 7 is a second explanatory diagram illustrating the operations of the printing mechanism 100 according to the second embodiment. FIG. 7 illustrates pages (images) I12 and I13 to be printed on the sheets M12 and M13, respectively. In FIG. 7, the page I12 includes five partial images P121 to P125, and the page I13 includes five partial images P131 to P135. Since FIG. 7 is provided for the description of flushing, retraction of the print head 110 described above is not performed and is not indicated in FIG. 7 to avoid complicating the diagram.

Flushing is an operation in which ink is ejected consecutively a plurality of times from each nozzle NZ in the print head 110 at a suitable timing. Since the objective of flushing is not to print on the sheet M, the operation is executed while the print head 110 is in a prescribed flushing position not above the sheet M to avoid ink becoming deposited on the sheet M. A receiving member such as a sponge (not illustrated) is disposed at the flushing position for receiving the ejected ink, thereby allowing flushing operations to be performed without staining the interior of the printer 200.

The flushing position is indicated in FIG. 7. As with the retracted position described above, the flushing position in the present embodiment is a prescribed position that is farther in the return direction (toward the −X side) than the sheet M. Alternatively, the flushing position may be different from the retracted position or may be a prescribed position that is farther in the outgoing direction (toward the +X side) than the sheet M, for example.

A flushing operation discharges dried ink from the nozzles NZ, allowing subsequent operations for ejecting ink to be performed reliably. If flushing is not performed for an extended period of time, defective ink ejection may occur, reducing the quality of the printed image. Hence, flushing is executed on a regular basis. In the present embodiment, flushing is executed each time P pages are printed (where P is an integer greater than or equal to one). Hereinafter, this flushing operation will be called inter-page flushing. In other words, after a previous inter-page flushing process has been performed, the next inter-page flushing is executed after P pages are printed and before printing has begun for the (P+1)-th page.

In the present embodiment, inter-page flushing is executed after printing every two pages (P=2). In the example of FIG. 7, the printing mechanism 100 moves the print head 110 to the flushing position after completing the last partial print for printing the second page I12. The printing mechanism 100 then conveys the sheet M while performing flushing with the print head 110 in the flushing position. After the sheet M has been conveyed and flushing is complete, the printing mechanism 100 executes the initial partial print for printing the third page I13.

In addition to inter-page flushing, flushing may also be executed after every Q number of partial prints (where Q is an integer greater than or equal to one). This type of flushing will be called inter-pass flushing. Specifically, inter-pass flushing is executed after completing Q number of partial prints following the previous inter-pass flushing and prior to beginning the (Q+1)-th partial print.

In the present embodiment, inter-pass flushing is executed after every thirteen partial prints (Q=13). For example, assume that the partial print for printing partial image P133 of page I13 is the thirteenth partial print following the preceding inter-pass flushing. In this case, the printing mechanism 100 moves the print head 110 to the flushing position after completing the partial print for printing the partial image P133, as illustrated in FIG. 7. The printing mechanism 100 performs flushing while conveying the sheet M as the print head 110 remains in the flushing position. After the sheet M has been conveyed and the flushing operation is complete, the printing mechanism 100 executes the next partial print for printing the partial image P134.

In the present embodiment, the CPU 210 of the printer 200 counts the number of pages printed and the number of partial prints executed and controls the printing mechanism 100 to execute inter-page flushing and inter-pass flushing on the basis of these counted results, independently of instructions received from the terminal device 300.

Figure 8:
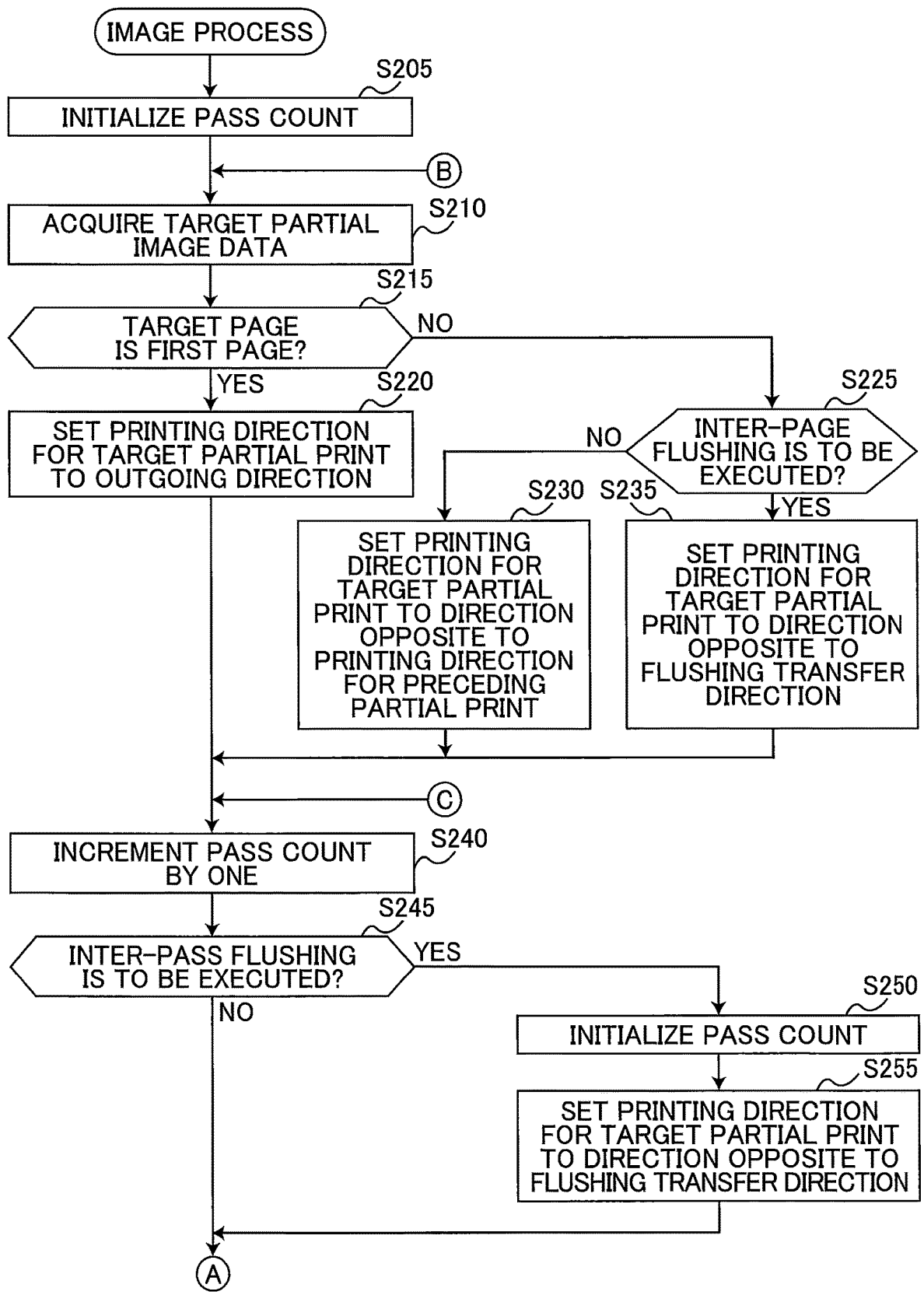
FIGS. 8 and 9 are flowcharts illustrating steps in the image process executed by the terminal device according to the second embodiment.
Figure 9:
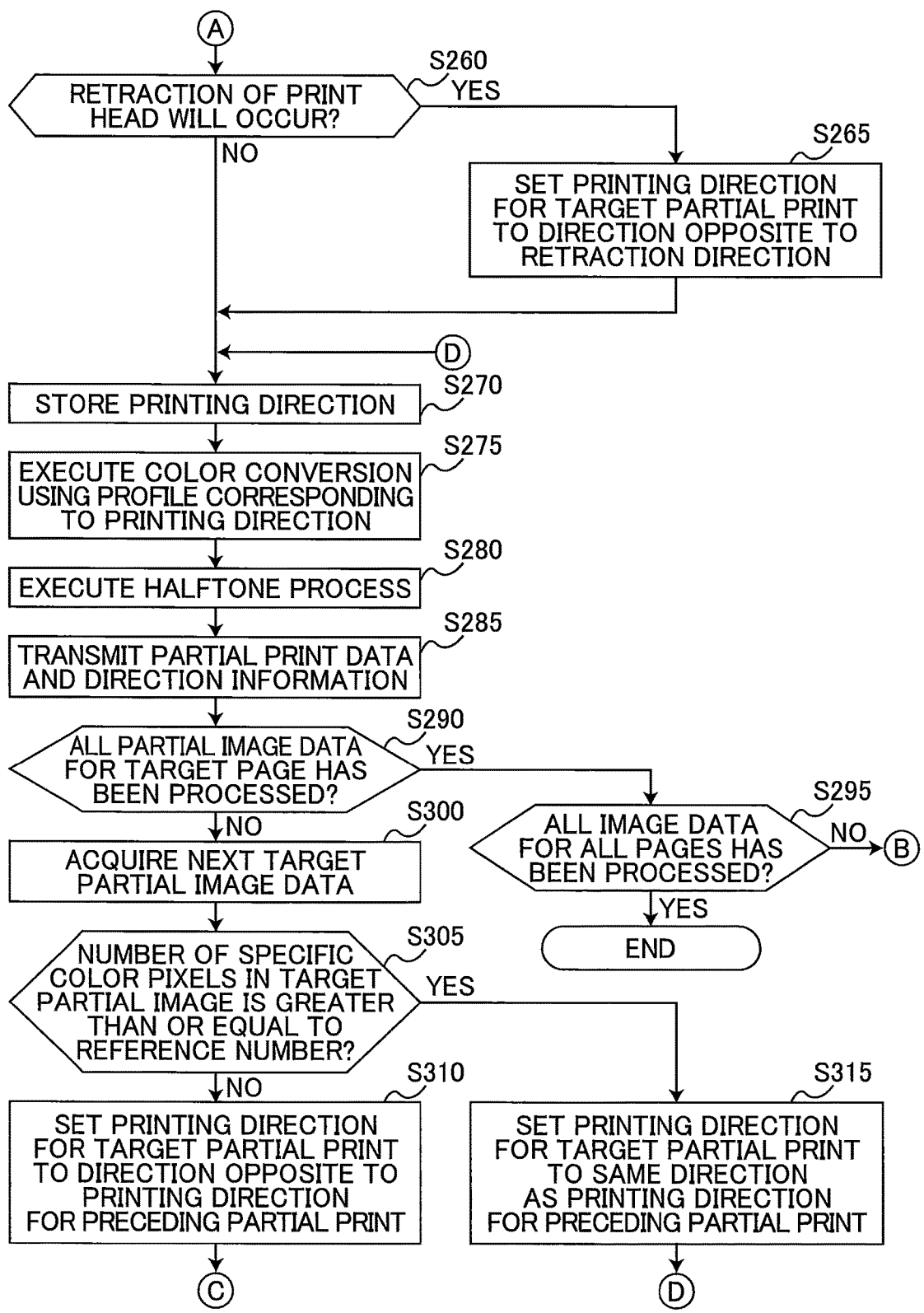

Next, an image process according to the second embodiment will be described. FIGS. 8 and 9 are flowcharts illustrating steps in the image process according to the second embodiment. As in the first embodiment, the CPU 310 of the terminal device 300 (FIG. 1) starts the image process of FIGS. 8 and 9 upon receipt of a print command from the user. Also as in the first embodiment, image data used for printing in the second embodiment is an image file that includes k pages (where k is an integer greater than or equal to two). As in the first embodiment, the print command is a command for printing multiple copies, i.e., a command for printing a set of pages specified by the image file m times (where m is an integer greater than or equal to two).

In S205 of FIG. 8, the CPU 310 initializes a pass count, and specifically sets the pass count to zero. The pass count is a variable used for counting the number of partial prints in order to recognize the timings at which inter-pass flushings are to be performed.

In S210 the CPU 310 acquires partial image data for one partial print as in S105 of FIG. 5. The CPU 310 acquires the partial image data from image data specified in the print command and stored, for example, in the non-volatile storage device 320 and sets the partial image data to the target partial image data. The CPU 310 stores this target partial image data in the buffer region 331. As in the first embodiment, the partial image data is RGB image data.

As in S110 of FIG. 5, in S215 the CPU 310 determines whether the target page is the first page, i.e., the initial page of the first copy. When the target page is the first page (S215: YES), in S220 the CPU 310 sets the printing direction for the target partial print to the outgoing direction.

If the target page is not the first page (S215: NO), in S225 the CPU 310 determines whether the inter-page flushing operation described above is to be executed on the printer 200 prior to printing the target page. As described above, inter-page flushing is executed every time two pages have been printed in the present embodiment. Hence, the CPU 310 determines that inter-page flushing will be executed when the target page is the {(2×L)+1}-th page to be printed (where L is an integer greater than or equal to one).

If inter-page flushing is not to be executed (S225: NO), in S230 the CPU 310 sets the printing direction for the target partial print to the opposite direction from the printing direction used in the preceding partial print. In other words, the printing direction is set to the direction opposite the printing direction used in the last partial print for printing the page prior to the target page.

When inter-page flushing is to be executed (S225: YES), in S235 the CPU 310 sets the printing direction for the target partial print to the opposite direction from a flushing transfer direction. The flushing transfer direction is the direction that the print head 110 must be moved to reach the flushing position described above in order to execute a flushing operation. As described above, the flushing position is a prescribed position farther in the return direction than the sheet M in the present embodiment (see FIG. 7). Accordingly, the flushing transfer direction is the return direction and in S235 the CPU 310 sets the printing direction for the target partial print to the outgoing direction.

In S240 the CPU 310 increments the pass count by one. In S245 the CPU 310 determines whether the pass count is a value indicating that inter-pass flushing described above should be executed prior to the target partial print. In other words, in S245 the CPU 310 determines on the basis of the pass count whether the inter-pass flushing operation is to be executed on the printer 200 prior to the target partial print. In the present embodiment, inter-pass flushing is executed after every thirteen partial prints are performed, as described above. Hence, when the pass count is thirteen, the CPU 310 determines that the pass count is a value indicating that inter-pass flushing is to be executed, that is, the CPU 310 determines that the inter-pass flushing is to be executed (S245: YES).

If the pass count is a value indicating that inter-pass flushing is to be executed (S245: YES), in S250 the CPU 310 initializes the pass count. In S255 the CPU 310 sets the printing direction for the target partial print to the direction opposite the flushing transfer direction. Since the flushing transfer direction in the present embodiment is the return direction, as described above, in S255 the CPU 310 sets the printing direction for the target partial print to the outgoing direction.

If the pass count is not a value indicating that inter-pass flushing is to be performed (S245: NO), that is, if inter-pass flushing is not to be executed (S245: NO), or after the CPU 310 sets the printing direction for the target partial print to the outgoing direction in S255, in S260 of FIG. 9 the CPU 310 determines whether retraction of the print head 110 will occur. Retraction is movement of the print head 110 toward the retraction position performed when the held state of the sheet M described above transitions from the double-sided held state to the single-sided held state. The CPU 310 can identify the held state of the sheet M for the target partial print and the held state of the sheet M for the partial print preceding the target partial print on the basis of the position of the target partial image on the target page in the conveying direction and the margin on the downstream side of the target page in the conveying direction. The CPU 310 determines that retraction of the print head 110 will occur when the held state of the sheet M is the single-sided held state for the target partial print and the double-sided held state for the preceding partial print.

When retraction of the print head 110 will occur (260: YES), in S265 the CPU 310 sets the printing direction for the target partial print to the direction opposite a retraction direction. The retraction direction is the direction that the print head 110 is moved toward the retraction position. As described above, the retraction position in the present embodiment is a prescribed position farther in the return direction than the sheet M (see FIG. 6). Hence, the retraction direction is the return direction and, therefore, in S265 the CPU 310 sets the printing direction for the target partial print to the outgoing direction. However, if retraction of the print head 110 will not occur (S260: NO), the CPU 310 advances to S270 without executing S265.

In S270 the CPU 310 records the printing direction set for the target partial print at this time in the buffer region 331. For example, the printing direction for the target partial print may be set in S230, S235, S255, or S265 described above or in S310 or S315 described later. Consequently, the printing direction may be set multiple times for the same partial image. For example, after the printing direction has been set in S230, the printing direction may be set again in S255 or S265. In such cases, the printing direction that was set last takes precedence and is recorded in the buffer region 331.

In S275, as in S130 of FIG. 5, the CPU 310 executes the color conversion process on the target partial image data using the outgoing profile PF1 or return profile PF2 that corresponds to the printing direction set for the target partial print. In S280, as in S135 of FIG. 5, the CPU 310 executes the halftone process on the converted target partial image data to generate partial print data for the target partial print. In S285, as in S140 of FIG. 5, the CPU 310 transmits the partial print data generated in S280 and direction information specifying the printing direction for the target partial print to the printer 200. Upon receiving the partial print data and direction information, the printer 200 uses this information to execute a partial print.

In S290 the CPU 310 determines whether all partial image data for the target page has been processed. If all partial image data for the target page has been processed (S290: YES), in S295 the CPU 310 determines whether image data for all pages to be printed has been processed. If the image data for all pages has been processed (S295: YES), the CPU 310 ends the current image process. However, if there remain any unprocessed pages (S295: NO), the CPU 310 returns to S210.

Further, if the CPU 310 determines in S290 that there remains unprocessed partial image data (S290: NO), in S300 the CPU 310 sets the partial image data representing the next partial image to be printed as the target partial image data and stores this target partial image data in the buffer region 331.

In S305, as in S165 of FIG. 5, the CPU 310 determines whether the target partial image represented by the target partial image data acquired in S300 includes a number of specific color pixels that is greater than or equal to the reference number. If the number of specific color pixels included in the target partial image is not greater than or equal to the reference number (S305: NO), in S310 the CPU 310 sets the printing direction for the target partial print to the direction opposite the printing direction used for the preceding partial print. After completing the process of S310, the CPU 310 returns to S240.

However, if the number of specific color pixels included in the target partial image is greater than or equal to the reference number (S305: YES), in S315 the CPU 310 sets the printing direction for the target partial print to the same printing direction as the printing direction used in the preceding partial print. After completing the process in S315, the CPU 310 returns to S270.

Next, the pages (images) to be printed in the above image process will be described. As a general rule, printing in the second embodiment is achieved by alternately executing outgoing prints and return prints (S230 of FIG. 8, S310 of FIG. 9), as in the first embodiment. This technique can reduce the amount of time required for printing.

Also when printing in the second embodiment, as in the first embodiment, the printing direction for the target partial print is set to the same direction as the printing direction used in the preceding partial print (S315 of FIG. 9) when the number of specific color pixels in the target partial image is greater than or equal to the reference number (S305: YES) and is set to the direction opposite the printing direction used in the preceding partial print (S310 of FIG. 9) when the number of specific color pixels is less than the reference number (S305: NO). This technique can suppress a drop in image quality in the page (image) being printed.

In the second embodiment, the CPU 310 determines whether the print head 110 will be moved for flushing or retraction (S225 and S245 of FIG. 8, S260 of FIG. 9). These movements of the print head 110 (the movement for flushing and movement for retraction) are processes in which the print head 110 is moved to a prescribed position (the retraction position or flushing position) on one side of the sheet M (the −X side in the present embodiment) in the main scanning direction (the X direction) without forming dots on the sheet M. When such movement of the print head 110 is performed, the CPU 310 sets the printing direction for the target partial print to the opposite direction of this movement (S235 and S255 of FIG. 8, S265 of FIG. 9) irrespective of the printing direction used for the preceding partial print. This technique can suppress wasted movement of the print head 110 between this movement of the print head 110 and the target partial print.

In the example of FIG. 6, the print head 110 is retracted after the partial print for printing the partial image P114. The print head 110 is also retracted after the partial print for printing the partial image P124. This retraction is indicated by arrows formed of dashed lines in FIG. 6. The printing direction for the partial print used to print the partial image P114 is the return direction, while the printing direction for the partial print used to print the partial image P124 is the outgoing direction. As illustrated in FIG. 6, the printing direction for the partial print following retraction (the partial print for printing partial images P115 and P125) is set to the outgoing direction (+X direction), which is opposite the direction of retraction, irrespective of the printing direction used for the preceding partial print. If the printing direction for a partial print following retraction were set to the return direction, after retraction the print head 110 would need to be moved in the outgoing direction to the starting position of a return print before the return print could be performed. This method would generate unnecessary movement of the print head 110, lengthening the printing time. The present embodiment can avoid this problem.

When the print head 110 must be moved because the held state of the sheet M is transitioning, the present embodiment can avoid unnecessary movement of the print head 110 between this retraction and the following partial print, thereby improving printing speed.

In the example of FIG. 7, the print head 110 is moved for flushing after the partial print for printing the partial image P125. The print head 110 is also moved for flushing after the partial print for printing the partial image P133. This movement of the print head 110 for flushing is indicated by arrows formed of dashed lines in FIG. 7. As illustrated in FIG. 7, the directions for partial prints following flushing (the partial prints for printing partial images P131 and P134) are set to the outgoing direction (+X direction), which is the direction opposite the flushing transfer direction. If the printing direction for partial prints following flushing operations were set to the return direction, the print head 110 would need to be moved in the outgoing direction to the starting position of a return print following flushing before the subsequent return print could be performed. This action generates unnecessary movement of the print head 110 that lengthens the printing time. The present embodiment avoids this problem.

In this way, the present embodiment can suppress unnecessary movement of the print head 110 between flushing of the nozzles NZ and the next partial print, thereby improving printing speed.

In the present embodiment, the timing for moving the print head 110 for flushing or for retracting the print head 110 is determined by the CPU 310 of the terminal device 300 (S225, S245, and S260 of FIG. 8). Accordingly, the terminal device 300 can set printing directions in consideration of flushing and retraction of the print head 110 at the time the terminal device 300 generates image data for printing. Further, since the terminal device 300 transmits partial print data and direction information to the printer 200 for each partial print, the printer 200 can print in suitable printing directions based on the direction information.

As illustrated in FIG. 7, the print head 110 can be moved for flushing in the present embodiment between the final partial print on the sheet M12 (the partial print for printing the partial image P125 in this example) and the initial partial print on the next sheet M13 (the partial print for printing partial image P131 in this example). Also as illustrated in FIG. 7, the print head 110 can be moved for flushing in the present embodiment between a partial print on the sheet M13 (the partial print for printing the partial image P133 in this example) and the next partial print on the same sheet M13 (the partial print for printing the partial image P134 in this example). In either of these cases, the present embodiment can suppress unnecessary movement of the print head 110 between the flushing operation and the following partial print.

C. Variations of the Embodiments (1) The image processes in the embodiments described above are merely examples and may be modified as needed. In the image process of FIG. 5 described in the first embodiment, print data for a first copy is generated separately from print data for a second copy, for example. In this case, the initial partial print in the first copy may be printed in a different direction from the initial partial print in the second copy. Alternatively, the print data for the first copy may also be used for printing the second copy, for example. In this case, the printing direction will be the same for the initial partial print in the first copy and the initial partial print in the second copy.

(2) Steps S305 and S315 may be omitted from the image process in FIGS. 8 and 9 described in the second embodiment. In this case, when the print head 110 is not moved for flushing or retraction, the printing direction for the target partial print is always set to the direction opposite the printing direction used in the preceding partial print (S310 of FIG. 9) irrespective of color in the target partial image.

(3) If the CPU 310 determines in S225 that the print head 110 will be moved for flushing (S225: YES), steps S245 and S260 may be omitted from the image process in FIGS. 8 and 9 described in the second embodiment. Similarly, if the CPU 310 determines in S245 that the print head 110 will be moved for flushing (S245: YES), step S260 may be omitted from the image process in FIGS. 8 and 9 described in the second embodiment.

(4) While the printer 200 executes both inter-page flushing and inter-pass flushing in the second embodiment, the printer 200 need only execute one type of flushing. In this case, the terminal device 300 can set the printing direction for partial prints while considering only the type of flushing executed on the printer 200.

(5) While the printer 200 executes both flushing and retraction in the second embodiment, the printer 200 need only execute one of these movements. In this case, the terminal device 300 can set the printing direction for partial prints with consideration only for the type of movement executed on the printer 200.

(6) In the second embodiment, inter-pass flushing is performed after every Q number of partial prints. However, inter-pass flushing may be executed before a subsequent partial print after a prescribed time has elapsed since the start of printing. In this case, the CPU 310 determines in S245 of FIG. 8 whether the pass count has reached a number of partial prints equivalent to a prescribed time and advances to S250 when the pass count has reached the number of partial prints equivalent to the prescribed time, that is, when the CPU 310 determines that the inter-pass flushing is to be executed (S245: YES).

(7) In the embodiments described above, the setting for performing flushing or retraction during printing is performed on the printer 200. However, the CPU 310 of the terminal device 300 may determine whether flushing or retraction is to be performed during printing and may transmit a flushing command or a retraction command to the printer 200 together with the print data and direction information. In this case, the printer 200 performs flushing or retraction during printing in accordance with the flushing command or retraction command.

(8) The structures illustrated in FIGS. 2A and 2B for holding the sheet M are merely one example and may be modified as needed. In the example of FIGS. 2A and 2B, the upstream-side holder includes the upstream rollers 142, the pressing members 146, and the low support members 145b. However, the upstream-side holder may include just the upstream rollers 142.

(9) In the image process of FIG. 5, the CPU 310 sets the printing direction for the target partial print to the same direction as the printing direction used in the preceding partial print when the number of specific color pixels included in the target partial image is greater than or equal to the reference number, but the present disclosure is not limited to this method. For example, the CPU 310 may set the printing direction for the target partial print to the same direction as the printing direction used in the preceding partial print when an object that includes specific color pixels is arranged across both the target partial image and the partial image to be printed in the preceding partial print. The CPU 310 can identify the layout of objects in the image using a process of object recognition known in the art, for example.

(10) Further, while the order of nozzle rows formed in the print head 110 beginning from the upstream side in the X direction of FIG. 3 is set to the nozzle rows NY, NM, NC, and NK, a different order of nozzle rows may be used.

(11) Instead of the sheet M, other medium, such as transparency for overhead projectors, a compact disc read only memory (CD-ROM), or DVD-ROM, may be employed as the printing medium.

(12) In the printing mechanism 100 according to the embodiments described above, the conveying unit 140 moves the sheet M relative to the print head 110 in the conveying direction by conveying the sheet M in the conveying direction. Alternatively, the printing mechanism 100 may move the sheet M relative to the print head 110 in the conveying direction by moving the print head 110 in the direction opposite the conveying direction with the sheet M fixed.

(13) In the embodiments described above, the terminal device 300 performs the image processes in FIGS. 5, 8, and 9. Alternatively, the CPU 210 of the printer 200 may serve as the image processing device performing the image processes in FIGS. 5, 8, and 9. In this case, the CPU 210 serving as the image processing device outputs print data and direction information and stores the print data and direction information in a predetermined memory region of the non-volatile storage device 220 or the volatile storage device 230, for example. The printing mechanism 100 of the printer 200 executes a partial print based on the print data and direction information stored in the memory region.

As understood from the above description, in the embodiments described above, the terminal device 300 is an example of the image processing device of the present disclosure, and the printer 200 is an example of the printer of the present disclosure. In the variations, the CPU 210 of the printer 200 is an example of the image processing device of the present disclosure, and the printing mechanism 100 of the printer 200 is an example of the printer of the present disclosure.

Alternatively, the device performing the image processes in FIGS. 5, 8, and 9 may be a server that acquires image data from a printer or a terminal device and generates a print job using the acquired print data, for example. Such a server may include a plurality of computers capable of communicating with each other via a network. In this case, the plurality of computers capable of communicating with each other via a network comprehensively exemplifies the image processing device of the present disclosure.

(14) In the embodiments described above, part of the configuration implemented in hardware may be replaced with software and, conversely, all or part of the configuration implemented in software may be replaced with hardware. For example, in a case where the image process in FIG. 5 is implemented in the printer 200, each of the color conversion process of S130 and the halftone process of S135 may be implemented in a dedicated hardware circuit such as an application specific integrated circuit (ASIC) running in accordance with a command from the CPU 210 of the printer 200.

While the description has been made in detail with reference to specific embodiments, it would be apparent to those skilled in the art that various changes and modifications may be made thereto.

What is claimed is:

1. An image processing device communicable with a printer, the printer including: a print head having a plurality of nozzles including a first nozzle and a second nozzle disposed apart from the first nozzle in a main scanning direction, the first nozzle being configured to eject a droplet of a first type of ink, the second nozzle being configured to eject a droplet of a second type of ink; a first scanner configured to perform a main scan moving the print head relative to a printing medium in the main scanning direction; and a second scanner configured to perform a sub scan intermittently moving the printing medium relative to the print head in a sub scanning direction orthogonal to the main scanning direction, the printer being configured to repeatedly and alternately execute a partial print and the sub scan to form an image represented by image data on the printing medium, the image comprising a plurality of partial images arranged in the sub scanning direction, the partial print forming a target partial image on the printing medium while performing the main scan, the plurality of partial images being represented by respective ones of plurality of sets of partial image data, the image processing device comprising a controller configured to perform:
   (a) selecting a single partial image one by one from the plurality of partial images as the target partial image, the target partial image being represented by target partial image data, the target partial image data corresponding to one of the plurality of sets of partial image data;
   (b) setting a printing direction for the partial print to one of a first direction and a second direction, the first direction and the second direction being parallel to the main scanning direction and being opposite to each other, the partial print being executed to form the target partial image while performing the main scan in which the print head is moved in the printing direction;
   (c) generating partial print data for the partial print by executing an image process on the target partial image data, the partial print data being used for forming the target partial image by the printer, the image process including a color conversion process using a color conversion profile, the color conversion profile being selected from a first profile and a second profile, the first profile being selected for the partial print for which the first direction is set as the printing direction, the second profile being selected for the partial print for which the second direction is set as the printing direction; and
   (d) outputting the partial print data generated for the partial print and direction information specifying the printing direction set for the partial print.

2. The image processing device according to claim 1, wherein the printer is configured to execute a plurality of partial prints including a first partial print and a second partial print to be executed subsequent to the first partial print, and
   wherein the (b) setting sets, in response to setting one of the first direction and the second direction as the printing direction for the first partial print, another of the first direction and the second direction as the printing direction for the second partial print.

3. The image processing device according to claim 2, wherein the image represented by the image data includes a plurality of pages including a first page and a second page following the first page, the first page being made up of a plurality of partial pages ending with a last partial page, the second page being made up of a plurality of partial pages starting with an initial partial page, the first partial print forming the last partial page, the second partial print forming the initial partial page.

4. The image processing device according to claim 2, wherein the image represented by the image data includes a plurality of pages starting with a first page and ending with a second page, the first page being made up of a plurality of partial pages starting with an initial partial page, the second page being made up of a plurality of partial pages ending with a last partial page, an m-number copies of the image including an n-th copy of the image and an (n+1)-th copy of the image being printed where m is an integer greater than or equal to two and n is an integer greater than or equal to one and less than m, the first partial print forming the last partial page of the n-th copy, the second partial print forming the initial partial page of the (n+1)-th copy.

5. The image processing device according to claim 1, wherein the printer is configured to execute a plurality of partial prints including a first partial print and a second partial print to be executed subsequent to the first partial print, and
   wherein the (b) setting comprises:
   (b1) determining whether a head retracting process is to be executed between the first partial print and the second partial print, the head retracting process retracting the print head to one side of the printing medium in the main scanning direction, a retracting direction of the print head in the head retracting process being one of the first direction and the second direction; and
   (b2) setting, in response to determining that the head retracting process is to be executed, another of the first direction and the second direction as the printing direction for the second partial print.

6. The image processing device according to claim 5, wherein the second scanner is a conveying unit configured to perform the sub scan by conveying the printing medium in a conveying direction parallel to the sub scanning direction, the conveying unit comprising:
   an upstream-side holder configured to hold the printing medium at a position on an upstream side of the plurality of nozzles in the conveying direction; and
   a downstream-side holder configured to hold the printing medium at a position on a downstream side of the plurality of nozzles in the conveying direction, the printing medium in a first state being held both by the upstream-side holder and the downstream-side holder, the printing medium in a second state being held not by the upstream-side holder but by the downstream-side holder, and
   wherein the head retracting process is to be executed between the first partial print and the sub scan in a case where a held state of the printing medium is going to transition from the first state to the second state during the sub scan performed between the first partial print and the second partial print.

7. The image processing device according to claim 5, wherein the head retracting process retracts the print head for a flushing operation of the plurality of nozzles, the flushing operation discharging ink from the plurality of nozzles.

8. The image processing device according to claim 7, wherein the image represented by the image data includes a plurality of pages including a first page to be formed on a first printing medium and a second page to be formed on a second printing medium subsequent to the first page, the first page being made up of a plurality of partial pages ending with a last partial page, the second page being made up of a plurality of partial pages starting with an initial partial page, the first partial print forming the last partial page, the second partial print forming the initial partial page.

9. The image processing device according to claim 7, wherein the head retracting process is to be executed each time the partial print is executed a predetermined number of times.

10. The image processing device according to claim 1, wherein the (a) selecting acquires the target partial image data, and the (b) setting sets the printing direction for the partial print using the target partial image data.

11. The image processing device according to claim 10, wherein the (b) setting comprises:
 (b3) determining, using the target partial image data, whether the target partial image includes a number of specific color pixels greater than or equal to a reference number;
 (b4) setting, in response to determining that the target partial image includes the number of specific color pixels greater than or equal to the reference number, the printing direction set for a preceding partial print as the printing direction for the partial print to be executed subsequent to the preceding partial print; and
 (b5) setting, in response to determining that the single partial image includes the number of specific color pixels less than the reference number, a direction opposite the printing direction set for the preceding partial print as the printing direction for the partial print.

12. The image processing device according to claim 10, wherein the (b) setting comprises:
 (b6) determining, using the target partial image data, whether an object including specific color pixels is arranged across both a preceding target partial image and a current target partial image, the preceding target partial image being the target partial image for a preceding partial print, the current target partial image being the target partial image for the partial print to be executed subsequent to the preceding partial print;
 (b7) setting, in response to determining that the object is arranged, the printing direction set for the preceding partial print as the printing direction for the partial print; and
 (b8) setting, in response to determining that the object is not arranged, a direction opposite the printing direction set for the preceding partial print as the printing direction for the partial print.

13. The image processing device according to claim 1, wherein the printer is connected to the image processing device via a network, and
 wherein the (d) outputting transmits the partial print data and the direction information to the printer via the network.

14. A non-transitory computer readable storage medium storing a set of program instructions for an image processing device communicable with a printer, the printer including: a print head having a plurality of nozzles including a first nozzle and a second nozzle disposed apart from the first nozzle in a main scanning direction, the first nozzle being configured to eject a droplet of a first type of ink, the second nozzle being configured to eject a droplet of a second type of ink; a first scanner configured to perform a main scan moving the print head relative to a printing medium in the main scanning direction; and a second scanner configured to perform a sub scan intermittently moving the printing medium relative to the print head in a sub scanning direction orthogonal to the main scanning direction, the printer being configured to repeatedly and alternately execute a partial print and the sub scan to form an image represented by image data on the printing medium, the image comprising a plurality of partial images arranged in the sub scanning direction, the partial print forming a target partial image on the printing medium while performing the main scan, the plurality of partial images being represented by respective ones of plurality of sets of partial image data, the image processing device including a controller, the set of program instructions, when executed by the controller, causing the image processing device to perform:
 (a) selecting a single partial image one by one from the plurality of partial images as the target partial image, the target partial image being represented by target partial image data, the target partial image data corresponding to one of the plurality of sets of partial image data;
 (b) setting a printing direction for the partial print to one of a first direction and a second direction, the first direction and the second direction being parallel to the main scanning direction and being opposite to each other, the partial print being executed to form the target partial image while performing the main scan in which the print head is moved in the printing direction;
 (c) generating partial print data for the partial print by executing an image process on the target partial image data, the partial print data being used for forming the target partial image by the printer, the image process including a color conversion process using a color conversion profile, the color conversion profile being selected from a first profile and a second profile, the first profile being selected for the partial print for which the first direction is set as the printing direction, the second profile being selected for the partial print for which the second direction is set as the printing direction; and
 (d) outputting the partial print data generated for the partial print and direction information specifying the printing direction set for the partial print.

* * * * *